Figure 1:
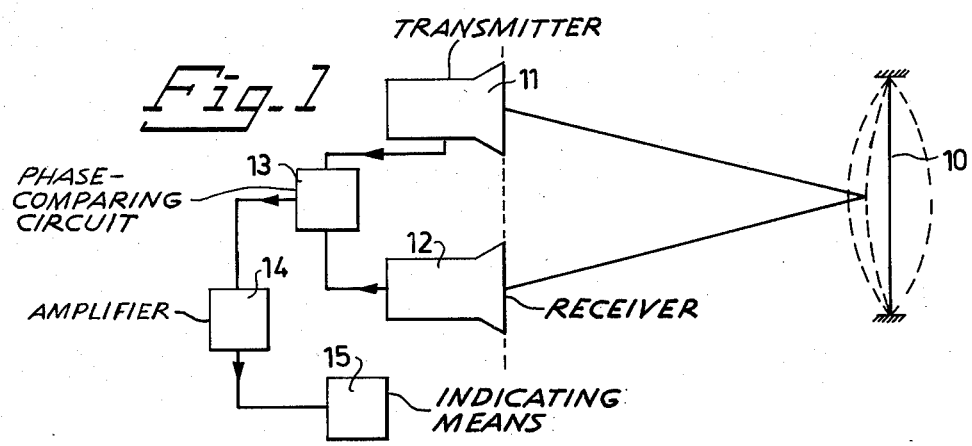

United States Patent [19]

Hellgren et al.

[11] 3,973,259
[45] Aug. 3, 1976

[54] DEVICE FOR INDICATING CHANGES IN THE POSITION OF AN OBJECT

[76] Inventors: Gösta Hellgren, Jungfrusundsvagen 17, 170 10 Ekero; Gunnar Wahlsten, Vedettvagen 22 A, 183 52 Taby, both of Sweden

[22] Filed: Nov. 4, 1974

[21] Appl. No.: 520,944

[30] Foreign Application Priority Data
Nov. 12, 1973 Sweden.............................. 7315257

[52] U.S. Cl.............................. 343/7.5; 343/12 R; 343/17.7
[51] Int. Cl.².......................... G01S 7/40; G01S 9/04
[58] Field of Search................... 343/7.5, 12 R, 17.7

[56] References Cited
UNITED STATES PATENTS
3,199,103   8/1965   Augustine......................... 343/12 R
3,730,628   5/1973   Wolcott et al. .............. 343/12 R X Primary Examiner—T.H. Tubbesing
Attorney, Agent, or Firm—Burns, Doane, Swecker & Mathis

[57] ABSTRACT

Apparatus for measuring vibrations in turbines and like objects in which electromagnetic signals are directed at the object by a transmitter and reflections of the signals from the object are received by a signal receiver. The transmitted and received signals are continuously compared to provide a signal representative of the phase relationship therebetween. The latter signal is used in calibrating apparatus which further includes means for intermittently frequency modulating the transmitter oscillator and provides automatic control of the oscillator frequency to bring the mean frequency of the transmitted signal to a value such that the phase difference between the transmitted and received signals is equal to $n \cdot 180°$, wherein $n$ is an interger. Between the intermittent calibration periods, the signal representative of the phase relationship is applied to indicating means as indicative of the vibrations of the turbine.

3 Claims, 5 Drawing Figures

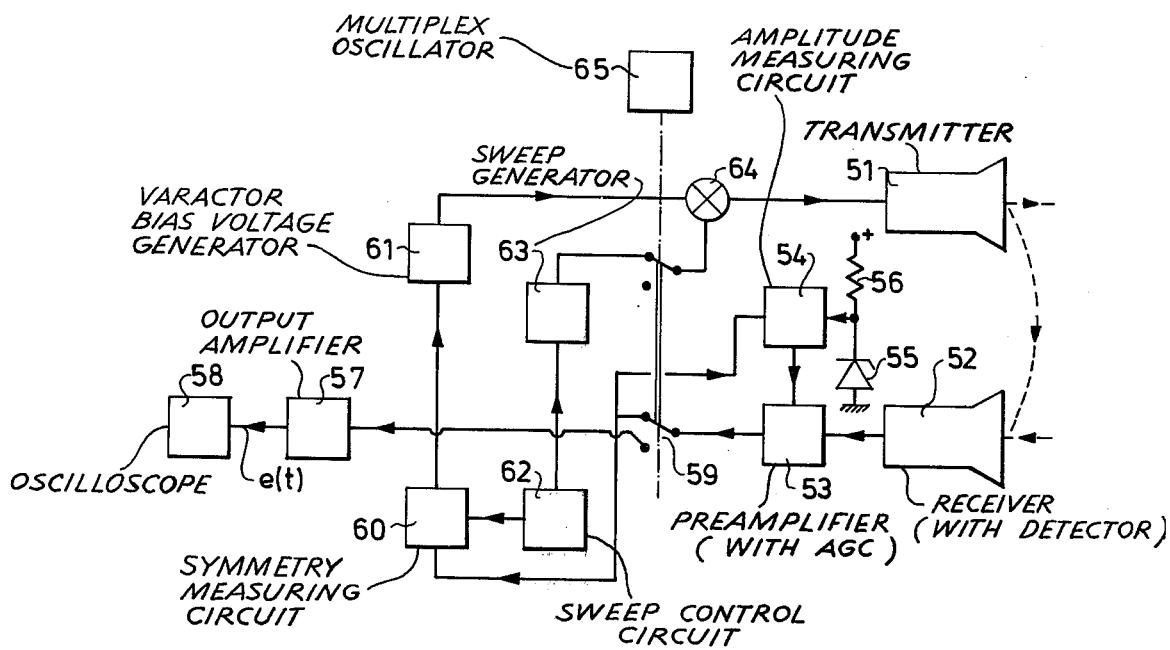

DEVICE FOR INDICATING CHANGES IN THE POSITION OF AN OBJECT

The present invention relates to a device for indicating changes in the position of an object, and more specifically to a device comprising a signal transmitter, a signal receiver, a phase comparing circuit and an indication means. Said signal transmitter has an output connected to a first input of said comparing circuit, said signal receiver has an output connected to a second input of said comparing circuit, and the output of the comparing circuit is connected to the indication means, said indication means being constructed to indicate changes in the position of the object on the basis of a comparison made in the comparing circuit of a signal transmitted from the signal transmitter to the comparing circuit and to the object and a signal reflected to the signal receiver from the object.

A measuring system previously known for measuring vibrations in turbines has a measuring body, i.e. a sensing device, which is to be mounted closely to the mantle surface of the turbine rotor without touching the surface. During the rotation the distance between the measuring body and the mantle surface will vary due to vibrations, and said distance variation is continuously measured. It is a great problem in this measuring system that very hard environment conditions are influencing the measuring body, namely a high temperature (500°C) which varies very much with the turbine load, a high pressure and a high humidity. Other methods suitable in other circumstances, for example optical or accoustic methods, are not possible to use in this case. Among possible electric methods for position measurements without touching the object the capacitive method must in this case be excluded for practical reasons. Hitherto only inductive methods of the reluctance or eddy current type have been used for measurements of vibrations in turbines. On the other hand it is known to use vibration measuring devices of the accelerometer type mounted on the outside of the rotor bearings in order to obtain a rough picture of the vibration level of the rotor system.

Inductive sensing devices or measuring bodies generally have a coil with several windings, which gives difficult material problems at the high temperatures at hand in these connections. High pressure and high humidity makes it difficult to make the measuring bodies tight. Under the conditions mentioned above the measuring bodies (the emitters) are not reliable. Nor is the electric output signal produced any unambiguous function of the vibrations. Instead the signal also varies with the distance of the emitter from the object, the material composition in the surface of the object (the rotor) and the temperature.

It is an object of the present invention to eliminate the disadvantages mentioned above. The characteristics of a device according to the invention are stated in the enclosed claim.

Figure 2:
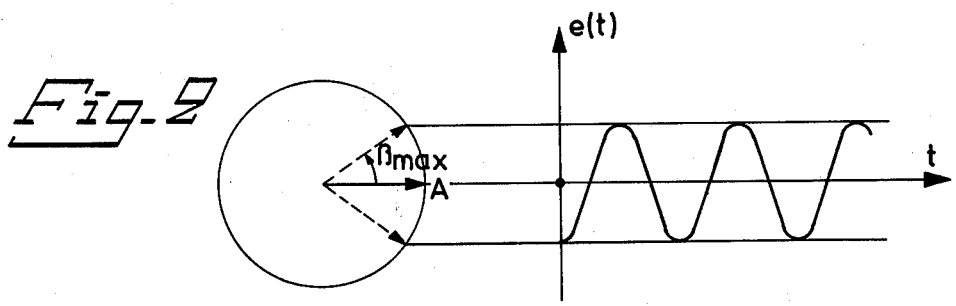
Figure 3:
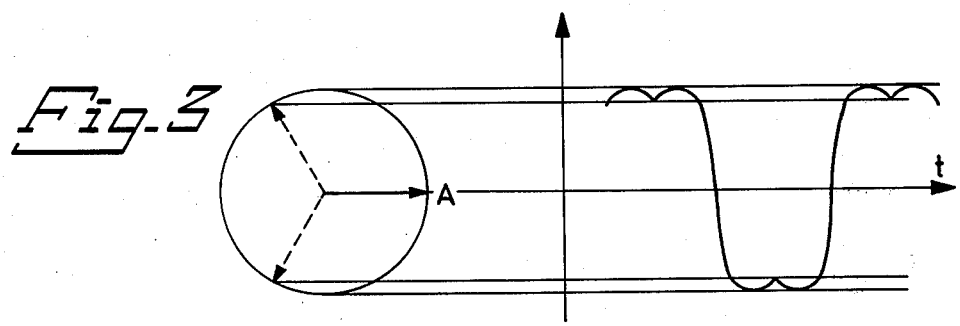
Figure 4:
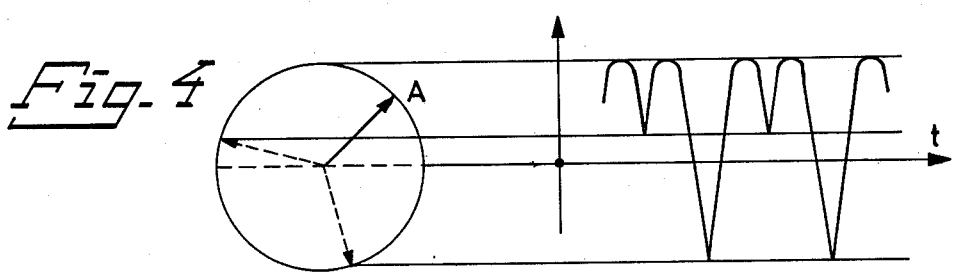

The invention will be closer described in connection with the attached drawing, in which FIG. 1 shows a block diagram of a device according to the invention, FIGS. 2–4 show signal diagrams to explain the function of the device according to FIG. 1, and FIG. 5 shows a block diagram of a device with automatic calibration.

The device according to FIG. 1 comprises a signal transmitter 11, a signal receiver 12, a phase comparing circuit 13, an amplifier 14 and an indication means 15.

The signal transmitter 11 transmits a signal towards a vibrating membrane 10, said membrane being situated at the average distance $l_o$ from the combination transmitter-receiver. Said membrane 10 reflects a signal towards the receiver 12, and in the comparing circuit 13 a phase comparison is made between the phase angles of the transmitted and the reflected signal. If the amplitude of the membrane 10 is called $a(t)$ and is assumed to have the extreme values $\pm a_{max}$, the total travelling length of the reflected signal will vary by $\pm 2a_{max}$ about the average value $2l_o$. If the wave length of the signal is called $\lambda$, the variation of this travelling length will correspond to $\pm 2a_{max}/\lambda$ cycles, i.e. a phase variation of $\pm \beta_{max} = \pm 2\pi \cdot 2a_{max}/\lambda$. In a system, where $\lambda \approx 3$ cm and $a_{max} << 1$ mm, $\beta(t) = 4\pi \cdot a(t)/\lambda$ will be a small angle. If the average travelling length $2l_o$ of the reflected signal is a whole number of wave lengths, the transmitted signal and the reflected signal will be in phase. This case is illustrated in the phase pointer diagram to the left in FIG. 2. The reflected signal which is represented by the full line arrow A, will vary by $\pm \beta_{max}$ from an average value in phase with the emitted signal (horizontal reference axis) due to the vibrations of the membrane 10. In the circuit 13 an electric output signal $e(t)$ is produced, which can be regarded as a projection of the arrow A on the vertical $e(t)$ axis in the voltage-time-diagram to the right in FIG. 2. As a consequence $e(t)$ will be $= A \cdot \sin\beta \approx A \cdot \pi \cdot 4 \cdot a(t)/\lambda$, wherein A is a scale factor determined by transmission and reflection attenuation, attenuation in the circuit 13 and other things, i.e. the output signal $e(t)$ will be a linear function of the amplitude $a(t)$ of the membrane 10.

In those cases, where the average length $2l_o$ is not a whole number of half wave lengths, the output signal $e(t)$ will be deformed. If the average length is for example an uneven number of half wave lengths (vertical reference axis), the projection of the arrow A on the $e(t)$ axis will be the same for two $\beta$-values with the same numeral value but with different signs. Therefore the signal $e(t)$ will have a frequency which is twice as high as earlier and which has a considerably less top-to-top amplitude. Of course the output signal will in this case provide a very distorted picture of the vibration as compared with the case in FIG. 2.

If the method of phase measurements of electric signals, preferably high frequency radio signals (micro waves) shall be of practical use, there are required means for adjusting the phase difference at hand between the transmitted signal and the received signal to $n \cdot 180°$, where $n$ is an integer. There are also required means for frequency modulation of an oscillator, which is comprised in the signal transmitter and is generating the transmitted signal. During the calibration/adjustment the oscillator (the micro wave oscillator) is thus frequency modulated over a small frequency area by a symmetric sweep signal. The sweep width is adjusted so that the phase difference between the transmitted and the reflected signal during the sweep will vary somewhat more than 180°. With the oscillator frequency without modulation adjusted so that the phase difference is $n \cdot 360°$ ($n$ is an integer), the phase arrow will move as indicated in FIG. 3 during the modulation. The projection of the end of the phase arrow A on the $e(t)$ axis will give the time variation of the output signal as in FIG. 2, see the right part of FIG. 3. When the end of the phase arrow A passes the top or the bottom of the diagram and soon thereafter turns back and passes the top or the bottom again, the characteristic tips shown to the right in the figure are obtained. The scale factor A is obtained from the distance 2A between the maximum and the minimum values of the signal.

If, when there is no modulation, the phase difference between the signals should differ from the value $n \cdot 180°$, the output signal, when there is modulation, will no longer be symmetric, i.e. one of the tips will be bigger and the other will be smaller or will be totally absent. This is shown in FIG. 4, where the average position of the phase arrow A is no longer horizontal, i.e. the phase difference between the transmitted and the received signal differs from $n \cdot 180°$. By adjustment of the median frequency of the oscillator or the average length $2l_o$ the symmetry can be reestablished and the phase difference will once again be $n \cdot 180°$. In this method of phasing in the system no vibration signal is required, and therefore the method can be used when the object to be measured is standing still.

The determination of the scale factor A according to the above is not disturbed by any vibration signal, as such a signal produces only a small phase jitter of the signal in the direction of the time axis and no amplitude jitter in the tops. Thus, it is possible to adjust and calibrate the measuring system at any time, for example during a measurement. Of course it is possible to make the system automatic, so that it will be self adjusting and/or self calibrating, and it is also possible to apply a time multiplex technique, whereby no vibration information will be lost.

In the expression for the output signal $e(t)$ as a function of the vibration amplitude $a(t)$ as described above, in addition to the scale factor A also a factor $\lambda$ is included, i.e. the signal wave length, which can be regarded as constant in all practical cases in spite of the fact, that the oscillator frequency is varied for example when the phase position is adjusted. This is due to the fact that the adjustment frequency range is very small compared with the average frequency and will lead to that the characteristics of the device can be optimized for one single frequency. One condition for this is that the signal travelling length $2l_o$ is great compared with the signal wave length.

In the device according to FIG. 5 an automatically calibrated output signal on a correct scale is produced as a measure of vibrations of an object located in front of the transmitter and the receiver of the device. The transmitter 51 is designed to transmit a signal to the object and also to a comparing circuit in the receiver 52, said receiver being designed to receive a reflected signal from the object. The output signal from the receiver 52 is fed to a pre-amplifier 53, said pre-amplifier being connected to a first input of an amplitude measuring circuit 54 by the upper position of a change-over contact 59. To the other input of said amplitude measuring circuit 54 a reference voltage is applied from a voltage divider 55–56 with a Zener diode 55. The output of the control circuit 54 is connected to a control input of the pre-amplifier 53. Due to this, when the change-over contact 59 is in its upper position as the result of the operation of the pulse generator or multiplex oscillator 65, said pre-amplifier 53 is brought to produce a calibration signal with a predetermined maximum value. The pre-amplifier 53 is connected to a measuring amplifier 57 in the lower position of the change-over contact. At the output side of said measuring amplifier an output signal $e(t)$ is obtained. Said signal is fed to an indication means 58 of some kind, for example an oscilloscope.

With the change-over contact 59 in said upper position the output of the pre-amplifier 53 is also connected to a symmetry measuring circuit 60 and from there to a bias voltage generator 61. The two last mentioned units are arranged so that an indication of an unsymmetrical input to the symmetry measuring circuit 60 produces an output signal to bias voltage generator 61 to bring about an adjustment to a phase difference of $n \cdot 180°$ (where $n$ is an integer) between the emitted and the reflected signal and are connected to a frequency control input of the emitter 51 by a summation circuit 64. A sweep control circuit 62 is connected to the circuit 60 and also to a sweep generator 63, said sweep generator 63 being connected to another input of the summation circuit 64 when the change-over contact 59 is in its upper position. The change-over contact 59 is driven by the pulse generator 65, the switch frequency of which is at least twice the frequency of the sweep generator at a continuous operation on the time multiplex technical basis with alternating calibration and vibration measurements.

Very slow changes in the position of an object to be measured will be interpreted by the device according to FIG. 5 as disturbing instabilities in the measuring system. They will not be included in the output signal $e(t)$ obtained by the pre-amplifier 53 and the measuring amplifier 57, but, on the other hand they will influence the phase adjustment system (comprising the symmetry measuring circuit 60 and the bias voltage generator 61) so that there will be a change in the control voltage to the transmitter 51. As a consequence there will be a change of frequency in the transmitter 51 as a compensation for the change in position of the object. By measuring the change of the output frequency of the transmitter, for example directly by a calibrated counting circuit or indirectly by a voltmeter for measuring of changes in the control voltage, the change in the electric length of the transmission path can be calculated and thereby also the size of the position change. However, at great position changes it is necessary to count the number of passed half wave lengths. Thus it is possible to check a possible presence of slow position changes of for example a turbine rotor by frequency measurements, and in this case slow changes of the characteristics of the electronic components which possibly occur do not influence the measurement results, if calibration is made in the way indicated.

When comparing the devices according to FIGS. 1 and 5 with regard to their function, it can be noted, that the unit 11 substantially corresponds to the units 61 and 51, the units 12 and 13 correspond to the unit 52, the unit 14 corresponds to the units 53 and 57, and the unit 15 corresponds to the unit 58.

What we claim is:

1. A device for indicating vibrations of an object comprising a signal transmitter including an oscillator for emitting electromagnetic signals toward the object, a receiver for receiving reflections of the transmitted signals from the object, a phase comparing circuit energized in accordance from the transmitted and received signals respectively to provide an output signal indicative of the phase relationship therebetween, indicating means for connection to said phase comparing circuit, means for intermittently frequency modulating the oscillator of said signal transmitter by a symmetric sweep signal over a frequency range small compared to the frequency of the transmitted signal, the frequency range of said means for intermittently frequency modulating the oscillator being such that the phase difference between the transmitted signal and the reflected signal at said receiver caused by said means somewhat exceeds 180°, and means responsive to the output of said phase comparing circuit and the means for intermittently frequency modulating the oscillator to set the oscillator to such a frequency that during the periods between the intermittent frequency the phase difference between the transmitted and received signals is $n \cdot 180^\circ$ where $n$ is an integer, and the output of said phase comparing circuit during said periods is representative of the vibrations of the object.

2. A device as claimed in claim 1, wherein switching means are included for connecting said indicating means for energization from said phase comparing circuit only during periods between operation of said means for intermittently frequency modulating the oscillator.

3. A device as claimed in claim 2 wherein said switching means alternately places hn operation the means for intermittently frequency modulating and connects the indicating means at a high frequency equal to the rate of intermittency of the means for frequency modulating.

* * * * *